US008976009B2

(12) United States Patent
McGie

(10) Patent No.: US 8,976,009 B2
(45) Date of Patent: Mar. 10, 2015

(54) VOICE RECOGNIZING DIGITAL MESSAGEBOARD SYSTEM AND METHOD

(71) Applicant: Peter McGie, Edmonton (CA)

(72) Inventor: Peter McGie, Edmonton (CA)

(*) Notice: Subject to any disclaimer, the term of this patent is extended or adjusted under 35 U.S.C. 154(b) by 0 days.

(21) Appl. No.: 14/179,989

(22) Filed: Feb. 13, 2014

(65) Prior Publication Data

US 2014/0159993 A1 Jun. 12, 2014

Related U.S. Application Data

(63) Continuation-in-part of application No. 14/133,179, filed on Dec. 18, 2013.

(60) Provisional application No. 61/881,494, filed on Sep. 24, 2013.

(51) Int. Cl.
| | |
|---|---|
| *G06F 3/041* | (2006.01) |
| *G06F 3/14* | (2006.01) |
| *G06F 3/147* | (2006.01) |
| *G09F 9/30* | (2006.01) |
| *G06Q 30/02* | (2012.01) |

(52) U.S. Cl.
CPC .............. *G06F 3/1438* (2013.01); *G06F 3/147* (2013.01); *G09F 9/301* (2013.01); *G06Q 30/0251* (2013.01)
USPC ........................................................ 340/7.55

(58) Field of Classification Search
CPC ...................................................... G06F 3/041
USPC ........... 340/7.55, 7.28, 7.29, 5.91; 705/14.55; 455/419, 420; 704/275; 345/2.3
See application file for complete search history.

(56) References Cited

U.S. PATENT DOCUMENTS

| | | | |
|---|---|---|---|
| 2003/0034934 A1 | 2/2003 | Brewer | |
| 2006/0059745 A1 | 3/2006 | Marqui | |
| 2007/0005206 A1* | 1/2007 | Zhang et al. .................... | 701/36 |
| 2008/0220760 A1* | 9/2008 | Ullah ............................. | 455/420 |
| 2008/0316153 A1 | 12/2008 | Yuen | |
| 2011/0013109 A1 | 1/2011 | Bryan | |
| 2011/0067059 A1* | 3/2011 | Johnston et al. ................ | 725/39 |

* cited by examiner

*Primary Examiner* — Edwin Holloway, III
(74) *Attorney, Agent, or Firm* — Daniel Boudwin; Global Intellectual Property Agency LLC

(57) ABSTRACT

Provided is a system and method of updating a message displayed on an electronic screen via wireless communications device or remote website. Messages are entered into the communications device (input terminal) or web interface via verbal commands or entered text. The input is then transmitted to one or more electronic screens, where the message is displayed. Thus, users can update an electronic display without directly manipulating the display screen. Each electronic screen is in enabled to wirelessly communicate over cellular networks and via BlueTooth connections. These connection methods enable pairing of multiple electronic screens to a single wireless communications device, as well as allowing multiple communications devices to manipulate any given screen directly or via web interface.

20 Claims, 6 Drawing Sheets

VOICE RECOGNIZING DIGITAL MESSAGEBOARD SYSTEM AND METHOD

CROSS REFERENCE TO RELATED APPLICATION

This application claims the benefit of U.S. Provisional Application No. 61/881,494 filed on Sep. 24, 2013, entitled "Verbalized," and is a Continuation in Part of U.S. Non-Provisional application No. Ser. 14/133,179, filed on Dec. 18, 2013 and entitled "Voice Recognizing Digital Messageboard System and Method." The above-identified patent application is herein incorporated by reference in its entirety to provide continuity of disclosure.

BACKGROUND OF THE INVENTION

1. Field of the Invention

The present invention relates to digital message display systems, and methods of use. More specifically, it relates to a display screen in communication with a wireless communication device. The wireless communication device has a stored application layer protocol, which facilitates transmission of entered input to one or multiple electronic display screens. A similar application layer is provided in the form of a web interface that is accessible from any Internet accessible computing device. A displayed message can be rapidly updated while the user is on the move, thereby reducing the time needed to change displayed messages.

Advertising is a key component in the success of any business. In order to find the optimal advertising method for their consumer demographic, businesses will place ads in a variety of locations using many different formats. Examples of common advertisements are billboards, window signs, newspaper ads, website ads, and bumper stickers. As the business grows and learns to better target its consumers, its advertising methods and messages may change. Traditional print media advertisements and even static website ads are unforgiving when it comes to modification. In order to update the ad, the business must commission a new design and have it deployed over the old advertisements. The process can be time consuming and resource intensive.

To solve the problem of switching out advertisements, many marketing providers now employ digital displays in the place of posters and billboards. The digital display contains a storage memory that stores advertising images. These images are displayed for a predetermined time, allowing multiple images to be shown on the same display. When the display needs to be updated to remove an advertisement image or add a new one, the content of the storage media is updated via a network link.

While these digital display systems enable marketing space providers to easily update displayed advertisements, the systems do not make it any easier for an advertising business to update the displayed message. Advertising businesses must still have new images created and submitted to the display maintainer if the business wishes to update their message. This makes it difficult for businesses to advertise flash sales, limited time offers, and other time sensitive messages. The high cost associated with generating and displaying these materials makes it cost prohibitive for many businesses to regularly update their ads.

A system and associated method of use is needed for dynamically updating digital displays in real-time. The present invention provides users with the ability to update a digital display via a cell phone paired to the display. Alternatively screens may be individually or batched updated via a web interface.

2. Description of the Prior Art

Devices have been disclosed in the prior art that relate to digital message displays. These include devices that have been patented and published in patent application publications. These devices generally relate to digital message displays. The following is a list of devices deemed most relevant to the present disclosure, which are herein described for the purposes of highlighting and differentiating the unique aspects of the present invention, and further highlighting the drawbacks existing in the prior art.

Digital displays are used throughout the advertising industry to provide a highly visible customizable source of commercial advertising. Large LED display configurations are affixed to billboards, where the resulting message is visible to highway motorists. Small backlight led displays are placed within restrooms, and in dining areas, to facilitate display of local advertisements. Any of these displays can offer rotating advertisements. This is a distinct improvement over traditional paper displays, which only offer one advertisement for viewing at a time.

Small digital displays can be attached to, or integrated into transportation vehicles such as buses and cars. An example of a vehicular display system is disclosed in Brewer, U.S. Patent Application Publication No. 2003/0034934. Brewer teaches a vanity display that secures to an automobile window, and a composition terminal. Text may be entered into the composition terminal for display on the vanity display screen. Though it does disclose the capability of updating the display via an Internet connection, Brewer does not teach updating via a cell phone application, nor does it teach voice recognition capabilities.

Another vehicular display device is disclosed in Marqui, U.S. Patent Application Publication No. 2006/0059745. The Marqui device is a digital display that can be secured to the exterior of an automobile. Multiple input capabilities are provided. Users can update displayed messages via an attached microphone, alphanumeric keypad, or via an Internet connection. Received input is stored on an onboard storage media and displayed on the screen. Unlike the present invention, the Marqui display does not include the use of a cellphone or other wireless device to update the display remotely.

Similarly, Bryan, U.S. patent Application Publication No. 2011/0013109 teaches a solar powered display unit that also provides storage for loose articles. The first side of the display has a screen that shows selected images. Photovoltaic cells are disposed along the front of the display in order to store and convert solar energy. The rear of the device has a white board, gps holder, notepad, and a number of other useful articles. The Bryan device does not disclose the system of the present invention and does not incorporate voice recognition or message updates via a wireless communications device.

The first digital message displays were hardened panels that were affixed to a structural support. Supports such as automobile bumpers, billboard backings, and store windows, were used to bear the load of a cumbersome display housing or panel. In recent years, advertising displays have become increasingly flexible. The use of flexible screens in advertising enables users to conform the advertising to the shape of the underlying support structure. Curved surfaces may be used to support a lightweight display, thereby expanding the scope of potential advertising placement options. An example of a flexible digital display is disclosed in Yuen, U.S. Patent Application Publication No. 2008/0316153.

These prior art devices have several known drawbacks. They do not disclose the wireless, updating of displayed messages via a Bluetooth enabled wireless communications device. The present invention provides a display that wirelessly communicates with a communications device to transmit message updates without the user physically interacting with the display. It substantially diverges in design elements from the prior art and consequently it is clear that there is a need in the art for an improvement to existing digital message display systems. In this regard the instant invention substantially fulfills these needs.

SUMMARY OF THE INVENTION

In view of the foregoing disadvantages inherent in the known types of digital message display systems now present in the prior art, the present invention provides a new wireless communication feature wherein the same can be utilized for providing convenience for the user when updating displayed messages while on the move The invention is a system and method for displaying and updating messages on an electronic display screen. The display screen is a discrete element, separate from the input means. The preferred implementation of the system employs two primary input means. The first input means is a wireless communications device such as a cell phone, with voice recognition capabilities as he input means. Using the Bluetooth protocol or other suitable short-range radio frequency data transmission protocol, the digital display communicates directly with the input means. Users may speak a message to the input means, which then transmits the message to the display screen. The second input means is a web interface similar to the user interface of the wireless communications device. Like the phone application, text may be entered into the web interface via spoken command or keyboard entry. Received messages are stored on a storage means within the electronic display screen and displayed in a visually recognizable format.

Multiple display screens may be paired with the same input means, turning the wireless communications device into a centralized advertising modification terminal. Electronic Display screens arranged throughout a store, vehicle, or fleet of vehicles, may be updated via speaking a message into the input terminal and transmitting it to individual display screens or all display screens at the same time. Alternatively, users that are not in proximity to the display screens can enter text into a web interface and submit the message for transmission to the screens. This dramatically reduces the time and cost associated with modifying advertising messages to reflect current shopping incentives. New display screens may be added to the list of accessible screens via Bluetooth pairing of the screen to the input means, or adding the GPRS controller information of each screen to the web interface list of available displays.

The ease of using the system is illustrated through the disclosure of a method of updating a digital display message. Because the system does not require a person to physically input information using his hands, he can update messages while driving, counting inventory, or being otherwise engaged. In this manner, flash sales can be advertised within seconds of a store manager's decision to cut prices. The system and method are rapidly deployable with highly customizable placements, making it adaptable to a variety of environments.

It is therefore an object of the present invention to provide a new and improved digital message display system that has all of the advantages of the prior art and none of the disadvantages.

It is another object of the present invention to provide a digital message display system in which displayed messages are updated via vocal commands given to a remote input terminal.

Another object of the present invention is to provide a method for updating a message displayed on a remote electronic screen via voice input transmitted to the screen.

Yet another object of the present invention is to provide a digital message display system in which displayed messages are rapidly modifiable in real time and without physical input from a user.

Still another object of the present invention is to provide a digital message display system in which multiple display screens may be updated from a single remote input terminal.

A further object of the present invention is to provide a digital message display system that may be readily fabricated from materials that permit relative economy and are commensurate with durability.

Another object of the present invention is to provide a digital display system that offers a remotely accessible web interface to enable remote users to update system display screens.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
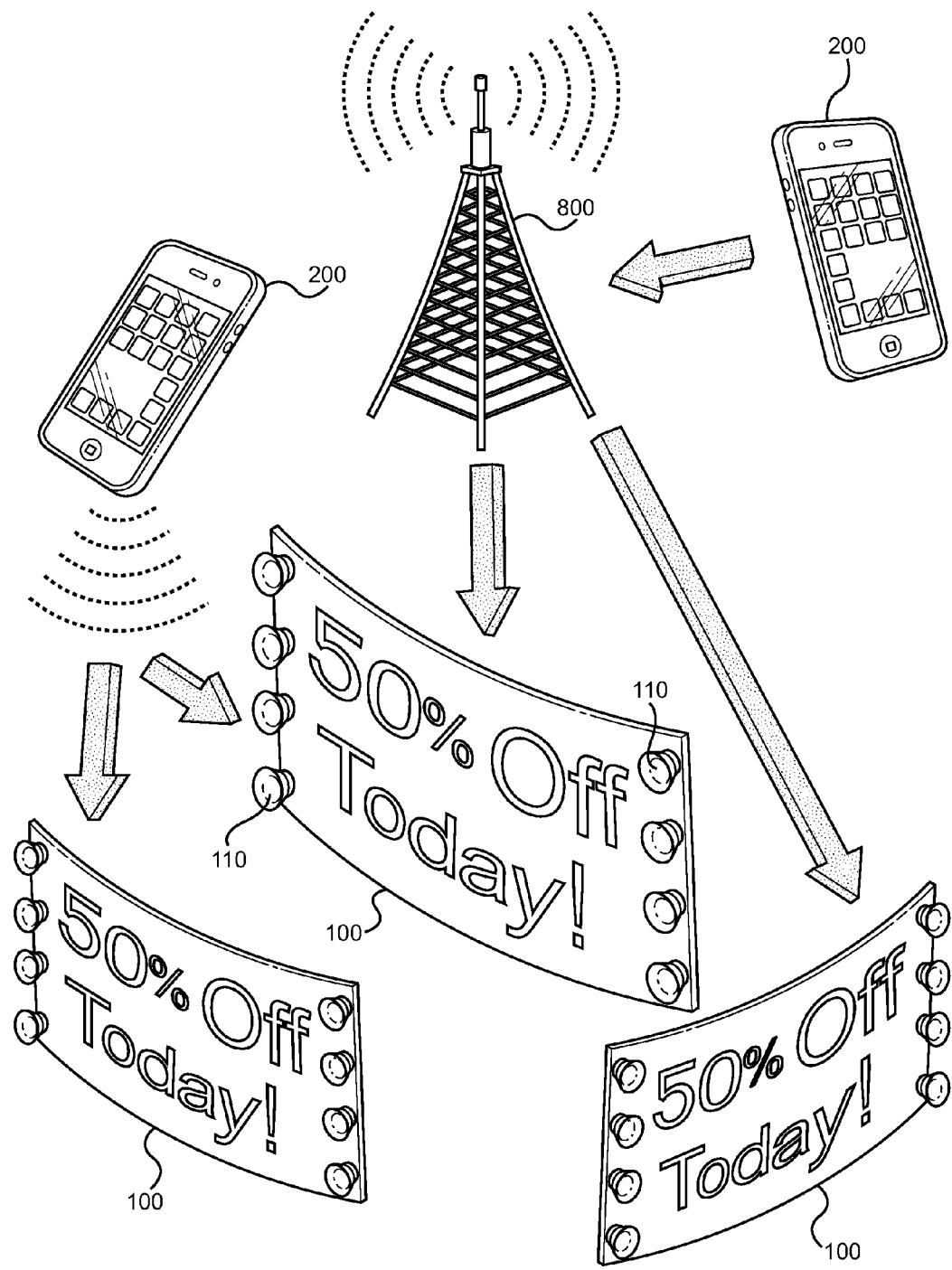
FIG. 1 shows a general diagram of the present digital message display system. The input means is illustrated as a smartphone for exemplary purposes.

Reference is made herein to the attached drawings. Like reference numerals are used throughout the drawings to depict like or similar elements of the digital message display system. For the purposes of presenting a brief and clear description of the present invention, the preferred embodiment will be discussed as used for updating a displayed message in real-time. The figures are intended for representative purposes only and should not be considered to be limiting in any respect.

Referring now to FIG. 1, there is shown an exemplary implementation of the digital message display system. The basic system employs a configurable electronic screen 100 to display messages. The messages may be remotely dictated by a user into an input terminal such as a smartphone 200, and then transmitted over a Bluetooth connection to the electronic screen. Each display screen has an associated pairing code that must be input into the input terminal in order to pair the two devices. Once pairing is complete, bi-directional data communication is possible. The system allows each electronic screen to be controlled from multiple input terminals provided the user knows the screen's pairing code. Several persons, such as store managers or business owners, can update a given screen via the users' separate input terminals.

Multiple electronic display screens may be in communication with the same input terminal, so long as the pairing code for each screen is entered into the input terminal. Thus, a user can control any number of electronic screens for which they have the pairing codes. Each display screen has a code retrieval button that results in display of the pairing code when pressed. This enables re-pairing of display screens if a connection is disrupted. As the electronic screens make use of Bluetooth the user is able to control these signs remotely provided they are within the approximately 50-100 meter range of Bluetooth signals. Signal range may vary depending on the Bluetooth version employed during system implementation, i.e. Bluetooth v4.0 LE versus v4.0, v3.0, et cetera.

To enable updating of display screens when users are outside the operating range of BlueTooth, Each display screen includes a general packet radio service (GPRS) controller that can receive GPRS tunneling protocol (GTP) data packets via a global system for mobile communications (GSM), universal mobile telecommunications system (UMTS), or long term evolution (LTE) network, thereby enabling the system to transfer data to the display screens over a cellular data network 800. If the input terminal detects that a desired display screen is out of range of BlueTooth based communications, the application may switch transmission methods to take advantage of a stable cellular network. In this method, all front-end procedures are the same, but changes to back-end procedure will occur to facilitate transmission via cellular network to an identification number associated with the GPRS controller of desired display screens.

Convenience of use may be further increased with the inclusion of a web interface hosted on a web server. One or more input terminals can access the web interface hosted on the server via a network. Each input terminal and server is implemented as a computing device having a system bus in communication with at least the components of: a central processing unit; a main memory; a storage memory; an input/output (I/O) controller; display devices; and a network interface, including a Bluetooth module and an optional RF amplifier. An operating system and various software routines are stored on the storage memory. Input/output devices such as a keyboard, touchpad, touchscreen, mouse, speakers, and a microphone may be connected to the I/O controller. The addition of further components or substitution of different configurations of a component will be known to one of ordinary skill in the art and are not enumerated in detail herein.

Each of said servers may run an application stack comprising but not limited to web servers, file upload/download servers, associated databases, and authentication applications.

The upload/download server and databases may be integrated with the web server application. Databases will retain user account information as well as display screen identifying information, to enable look up of GPRS identifier information associated with display screens and message transmission to same. A web server includes sub-applications for hosting a website and providing client-side services. Input terminals can access these services via a website hosted on said web server, pending successful login with the authentication application. Authentication may consist of password checking, credential verification, or confirmation of other identifying information. Once a user is authenticated, they can begin entering messages and transmitting to selected display screens. In this manner, the web interface may be accessed using any Internet accessible computing device.

In some embodiment, GPTS identifier information associated with a particular display screen may be automatically transferred to the input terminal upon initial BlueTooth pairing with the display screen. This information may then be automatically uploaded to the webserver database upon registration with the website. Alternatively, the user may need to input this information manually each time he or she desires to add new screens to the list of available display screens.

Figure 2:
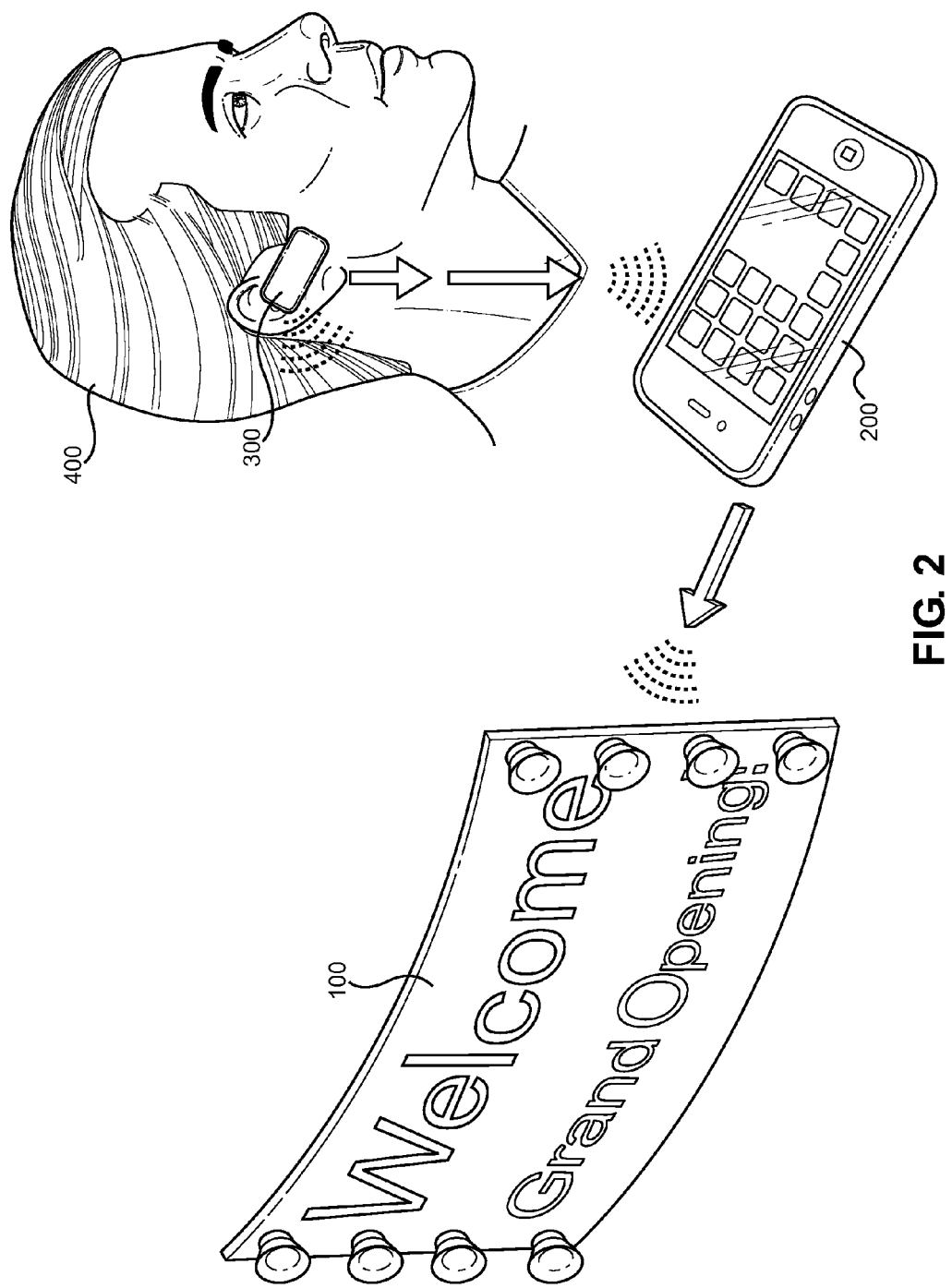
FIG. 2 shows a general diagram of the present digital message display system with a Bluetooth microphone receiving voice commands from a user. Voice input is then transmitted to the cellphone prior to transmission to the display screen.

Each input terminal utilizes installed voice recognition software to convert verbal instructions into data segments. Converted verbal input is transmitted in data packets to one or more display screens via a Bluetooth connection or over cellular network. Bluetooth enabled microphones and headsets may also be paired to the input terminal to provide an additional means of verbal input. As shown in FIG. 2, an earpiece style Bluetooth headset 300 comprising at least a microphone, a speaker, a transceiver, a memory, a central processing unit, and a storage memory is paired to the input terminal smartphone 200. Verbal input is transmitted from the headset to the smartphone, which relays the transmission to the display screen 100. This configuration enables a user 400 to modify displayed messages via a hands-free microphone.

In addition to the aforementioned features of the input terminal devices, each unit includes a custom application layer protocol with client interface to facilitate transmission of messages to different display screens. New display screens are identified via using a Bluetooth lookup and filtering against the manufacturer MAC vendor block. By default devices use the final three bytes of the MAC address as hexadecimal and the name of the manufacturer prepended as a device name (Example 0F:AC:DE); this identification can be customized by the user to be more meaningful for the given display screen. A settings interface is incorporated into the client interface of the application. Users can modify display screen names (identification string) and pairing codes via the settings interface.

Figure 3:
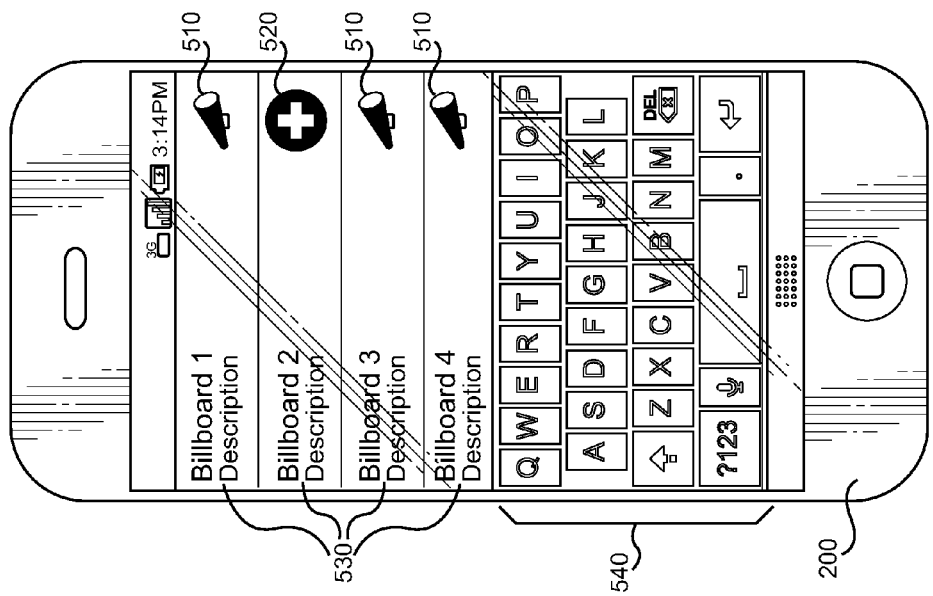
FIG. 3 shows an exemplary display screen selection interface. A list of display screens paired with the cellphone is shown to the user, who may select the screens he wishes to update.

A view of an exemplary discovered display screens list is shown in FIG. 3. The list is displayed on the screen of an input terminal 200. From this view a list of discovered screens is shown for selection. Display screens that have already been paired offer a quick message button 510 allowing the user to load a previously stored "quick message", otherwise a pairing icon 520 is displayed. Selection of a quick message button will provide a user with a list of previously stored messages. Selection of the pairing icon will prompt the user to enter the display screen's pairing code using an alphanumeric keypad 540, whether physical or touchscreen based. If the user selects the display screen identifier 530 instead of an icon the message input interface will be displayed.

Figure 4:
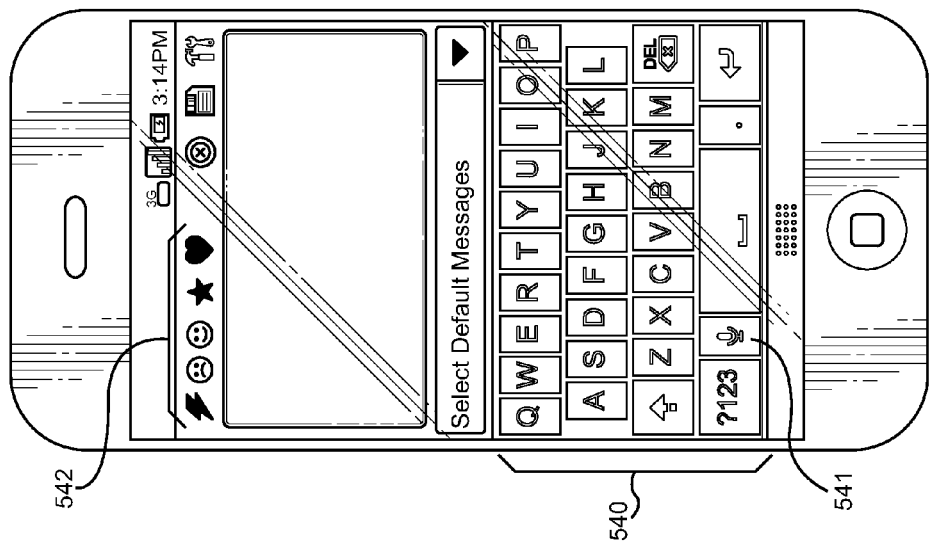
FIG. 4 shows an exemplary text interface on a cellphone screen. Users may use the alphanumeric keypad to input text for transmission to the remote display screen.

An exemplary message input screen is shown in FIG. 4. An input terminal 200 having a client interface is provided to update the display screen message output remotely. The software leverages the input terminal's voice recognition functionality to enable the user to speak a message for transcription to text and transmission to the display screen for display. From the message input screen the user may select a speak button 541 to initiate sound recording. Once analog input is converted into digital signals and then analyzed for language patterns, the resulting text is displayed on the input terminal screen for review. Alternatively, the user may enter a message via the alphanumeric keypad 540. Various icons (happy face, heart, clover, etc.) are accessed via icon buttons 542. Completed messages may be saved as "quick messages" for later use, or may be transmitted to the display screen of a user's choosing for immediate display. It should be understood that the web interface should offer substantially the same functionality as the client interface available on a wireless communications device in connection with display screens via a BlueTooth connection.

Figure 5:
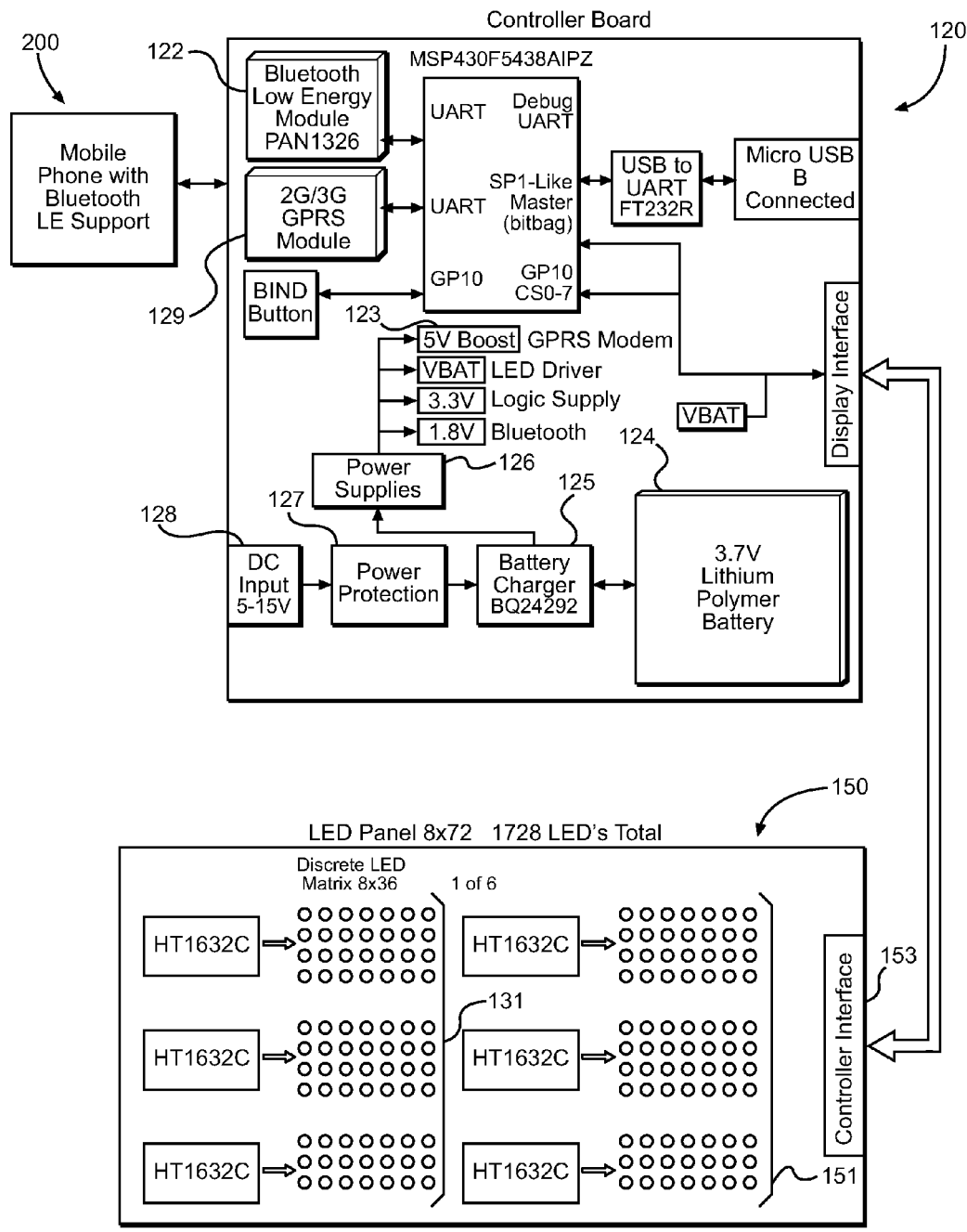
FIG. 5 shows a schematic diagram of an exemplary implementation of the display screen.

Turning now to FIG. 5, there is a block diagram showing exemplary display hardware architecture. The configuration disclosed herein is for illustrative purposes only and the invention is not limited to any particular implementation of an electronic screen. The screen may be a rigid or flex-printed screen depending on the intended use of the system.

In the exemplary embodiment, each electronic screen comprises the display controller board 120 and the LED panel board 150. The panel can operate from a 12VDC power supply provided by a vehicle, an AC adapter, or the display can operate for short periods of time running off an internal rechargeable battery.

The LED display panel 150 is an electronic display panel consisting of 1728 individual LEDs arranged as a matrix of 3 rows of 8×72 LEDs 151. This display is generally capable of displaying 3 lines of 12 characters formed by a typical 5×7 character font. The PCB layout of the display panel has blank space between the rows for added readability. The LED panel is implemented with discrete LEDs, which permit flexible printed circuit board implementations that can conform to curved surfaces. Each panel has 6 LED drivers, which drive the individual LEDs using a time-multiplexed technique. A serial interface bus 153 is used to interface the LED drivers to the Display control board. The exemplary LED Display board is designed for implementation on a PCB with 2 wiring layers.

The Display Controller board 120 receives messages from the input terminal application layer via a Bluetooth radio interface 122 or GPRS interface 129. An internal microcontroller 121 processes and validates the messages received and controls the display drivers 123 over an internal serial communication bus. A power supply and battery charger 125 on the controller board conditions the external 12VDC power to generate the necessary voltages and signals required to power the microcontroller, Bluetooth module, and GPRS module, and to charge the internal battery 124. The controller board is implemented on a 4 layer PCB consisting of 2 wiring layers and 2 power and ground layers.

The main control functions of the electronic display screen are implemented in a programmable microcontroller with integrated 256 KB of FLASH and 16 KB of SRAM memory. This controller is based on the MSP430 family of ultralow power microcontrollers, which are well suited for battery-powered applications. These microcontrollers are available from Texas Instruments, Inc. in Dallas, Tex. Other low energy MCUs may also be used in the manufacture of the display. A JTAG interface is implemented to program the internal FLASH memory at manufacturing time with the manufacturer or brand custom firmware. An 120 like serial interface interfaces the controller to the battery charger for future monitoring if required. The interface to the Bluetooth module is implemented using an UART interface, while the interface to the display drivers consists of an SPI like serial interface implemented in software and hardware GPIO pins. Each of the display drivers also has a chip select pin implemented using GPIO.

The wireless Bluetooth interface is implemented with a Panasonic PAN 1326 module, such as those available from Panasonic, Inc. in Secaucus, N.J., and is based on a TI (Texas Instruments) CC256x Bluetooth IC. This module is powered from the 1.8V supply so U6 is used to convert the serial interface to the microcontroller, which operates off the 3.3V supply. The Bluetooth module has an internal antenna that must have an RF path to the outside of the enclosure in order to communicate properly with the input terminal.

The wireless GPRS modem is implemented with a complete module such as the Janus GSM865CF Terminal Modem, such as those available from Janus Remote Communications, located in Aurora, Ill. The module is powered from the 5.0V boost supply. The module has a connector that enables connection to an external or internally placed antenna. The selection of an internal versus an external antenna will be known to one of ordinary skill in the art and may be decided based on manufacturing needs. It should be noted that the GPRS module is exemplary and that modules of alternate standards may be implemented to take advantage of second, third, fourth and higher generations of wireless technology.

The power supply for the display controller is capable of operating from 5 to 15 volts. An over voltage a reverse polarity circuit 127 protect the battery charger from damage if the wrong adapter is used in the DC input 128. The Battery charger is implemented with U2 a BQ242921 controller IC that is a highly integrated switch-mode battery charge management IC for single cell Li-Ion and Li-Polymer batteries. The charger can operate without software control, but has a serial bus, which has been connected to the internal microcontroller for future battery monitoring functions. The controller generates the main system power bus which is in the range of the nominal battery voltage 3-4.3V, which is used for powering the main display LED's. This system voltage is further regulated to 5, 3.3, and 1.8 volts for powering the system microcontroller, GPRS and Bluetooth modules. The 3.3 and 1.8-volt supplies are simple linear voltage step down regulators. The 5V supply requires a boost converter to step-up the battery voltage to a regulate 5V. An On/Off switch is used to turn off the power supply, which in turn turns off the display when not needed to prevent the battery from becoming discharged.

In a preferred embodiment, the electronic display screen has a depressible button that causes the pairing code associated with the screen to be displayed thereon. This functionality facilitates retrieval of lost or forgotten pairing codes.

In some embodiments, the electronic display screen will have a plurality of suction cups secured to portions of its outer perimeter. Further, magnetic strips may be attached to the rear of the electronic display screen. Thus, the screen can be removably secured to a window using the suction cups, or the side of a vehicle using the magnetic strips. These features function particularly well in embodiments of the system employing flexible display screens.

Figure 6:
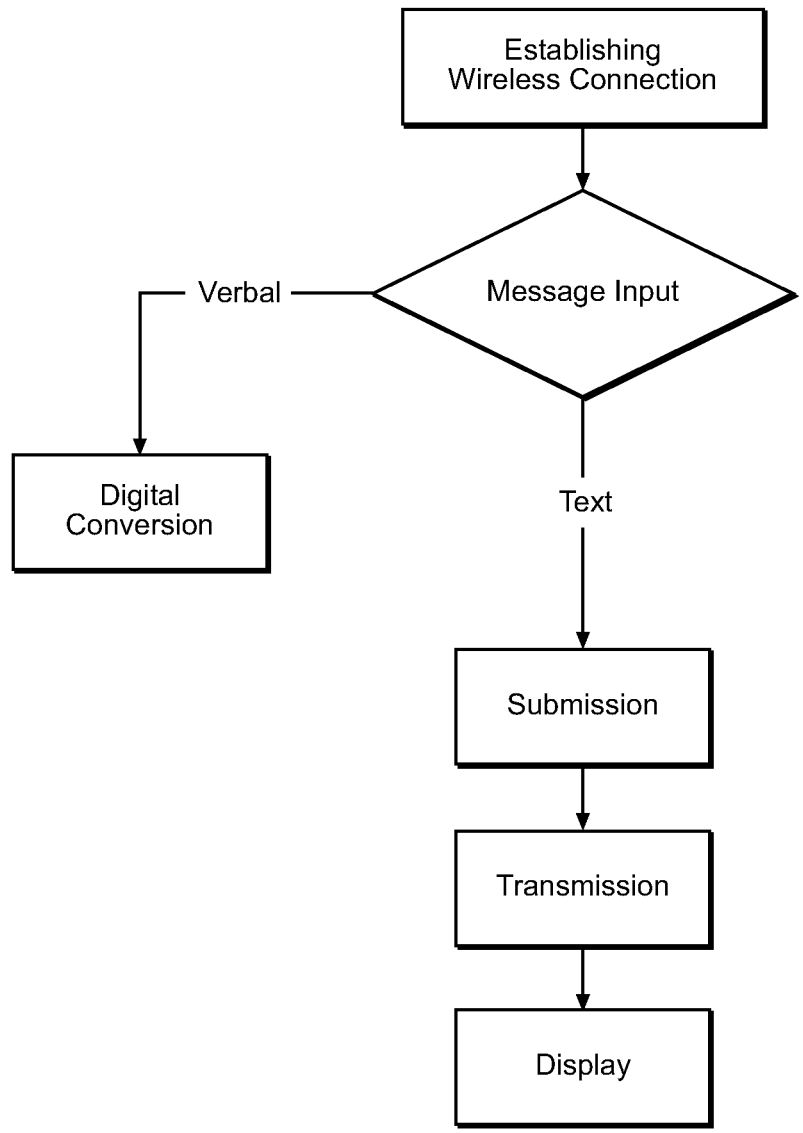
FIG. 6 shows a flow diagram of a method of updating a displayed message.
Figure 7:
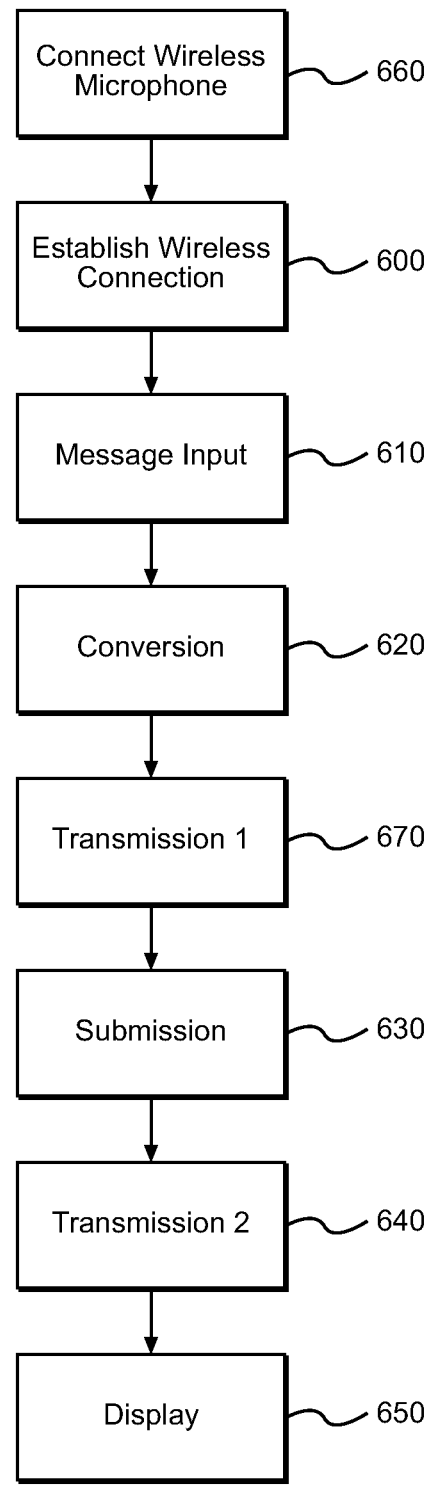
FIG. 7 shows a flow diagram of an additional method of updating a displayed message.

Any embodiment of the electronic display screen and input terminal falling within the general disclosure above may be used with the present system. Flow diagrams of the use of the system are shown in FIGS. 6 & 7. To use the system, a person first establishes wireless communication 600 between at least one electronic display screen and at least one input terminal.

This is accomplished one of two ways. The first method includes entering the pairing code associated with at least one of the electronic screens into a client interface on the input terminal. The second method is by registering the display screen with a web interface and associating it with a user account or particular input terminal, thereby enabling future transmission to the display screen. The registration step will involve input of an identification number associated with the display screen GPRS controller interface. A message is then entered 610 via verbal command or textual input. If the message is spoken into the microphone of the input terminal, then conversion 620 of the analog signal to a digital one takes place prior to text appearing on the screen for approval. Once the user approves the message and submits it 630. The message is then transmitted 640 to the one or more electronic displays selected by the user. If the input terminal is within BlueTooth communication range and paired to the selected display screens, transmission of the message data occurs utilizing the BlueTooth protocol. If the user is not within the short range of BlueTooth Communication, then transmission is made via cellular data network. Messages received by the electronic screen are displayed 650 on the screen in a visually recognizable format.

Optionally, a Bluetooth microphone or headset may be paired 660 with the input terminal prior to message generation. Once the headset is in active communication with the input terminal, the process as described above can begin. Verbal commands are spoken to the headset, and are then transmitted to the input terminal prior to transmission 670 to the electronic screen. In this embodiment, analog to digital conversion takes place within the Bluetooth headset or microphone.

The present invention is a system and associated method of use for updating a digital display via a wireless communications device. Users can turn their smartphone or tablet computer into a system input terminal by installing a software application. Any number of Bluetooth and GPRS enabled electronic screens may be paired with the input terminal device. Display screens may also be registered with a website and associated with a user account or a particular input terminal. The website can be accessed via any Internet enabled input terminal computing device to send messages to display screens over a cellular data network. Once pairing and/or web registration is complete, the user can update the displayed message any time he chooses, via a client interface in the software application or web interface on the website. Messages may be spoken into the input terminal, thereby eliminating the need for the user to physically enter message text. In this way, the system and method provide a display updating means that is safe to use while driving, operating machinery, or being otherwise engaged.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A digital message display system comprising:
   at least one remote input terminal, comprising a central processing unit adapted to handle conversion of analog voice input to digital signals, a storage memory, an input/output controller, a network interface adapted to receive and transmit wireless data, an alphanumeric input means, a microphone, speakers, a display, and a power source;
   at least one webserver hosting a website;
   one or more wireless networks;
   at least one electronic display screen comprising an illumination means, a microcontroller unit, a memory, a transceiver, a modem, a power source, and a code retrieval button disposed on an exterior portion of said at least one electronic display screen and electronically connected to said microcontroller unit such that depression of said button results in display of a code associated with said at least one electronic display screen via said illumination means, and wherein said at least one electronic display screen is in bi-directional wireless communication with said at least one remote input terminal and said at least one webserver;
   an application layer installed on said storage memory of said at least one remote input terminal, wherein said application layer converts user input into a signal and transmits same to said at least one electronic display screen for display;
   an interface associated with said website, wherein said application layer converts user input into a signal and transmits same to said at least one electronic display screen via said one or more wireless networks for display.

2. The system of claim 1, wherein said at least one remote input terminal further comprises RF amplifiers.

3. The system of claim 1, wherein each of said at least one remote input terminal and said at least one electronic display screen is Bluetooth enabled.

4. The system of claim 1, wherein said at least one remote input terminal is a smartphone.

5. The system of claim 1, wherein said at least one electronic display screen is a flexible LED display.

6. The system of claim 1, wherein said at least one electronic display screen further comprises suction cups secured to an exterior perimeter of said at least one electronic display screen.

7. The system of claim 1, wherein said at least one electronic display screen further comprises ferrous material secured to a backside of said at least one electronic display screen exterior.

8. The system of claim 1, wherein said modem comprises a GPRS interface.

9. The system of claim 1, wherein said one or more wireless networks are cellular data networks.

10. The system of claim 1, further comprising:
    a wireless microphone in communication with said at least one remote input terminal, wherein said wireless microphone comprises a digital signal processor, a memory, a transceiver, and a power source.

11. The system of claim 10, wherein said wireless microphone further comprises at least one speaker.

12. The system of claim 1, wherein said user input is verbal commands spoken into said microphone of said least one remote input terminal.

13. A method of updating a message displayed on an electronic screen, comprising the steps of:
- establishing wireless communication between at least one remote input terminal and at least one electronic display screen, wherein said wireless communication may comprise a direct communication or an indirect communication transacted through a webserver, and said wireless communication is established by entering a pairing code associated with and displayed on said at least one electronic display screen into a client interface on said at least one remote input terminal;
- inputting a message into a microphone associated with said at least one remote input terminal;
- converting analog signals received by said microphone into digital signals;
- submitting said digital signals for transmission;
- transmitting said digital signals to said at least one electronic display screen;
- displaying received digital signals in a textual format by said at least one electronic display screen.

14. The method of claim 13, wherein said direct communication is via Bluetooth pairing.

15. The method of claim 13, wherein said indirect communication occurs over a cellular data network.

16. The method of claim 15, wherein said microphone comprises a wireless microphone in communication with said at least one remote input terminal.

17. The method of claim 16, wherein said microphone is in communication with said at least one remote input terminal via a Bluetooth connection.

18. The method of claim 16, further comprising the step of:
- transmitting said digital signals to said at least one remote input terminal from said wireless microphone prior to submitting said digital signals for transmission to said at least one electronic display screen.

19. A method of updating a message displayed on an electronic screen, comprising the steps of:
- establishing wireless communication between at least one remote input terminal and at least one electronic screen, wherein said wireless communication may comprise a direct communication or an indirect communication transacted through a webserver, and said wireless communication is established by registering said at least one electronic display screen with a web interface and associating said at least one electronic display screen with at least one remote input terminal, thereby enabling future transmission to said at least one electronic display screen;
- inputting a message into a wireless microphone of said at least one remote input terminal;
- wherein said wireless microphone is in communication with said at least remote one input terminal;
- converting analog signals received by said wireless microphone into digital signals;
- submitting said digital signals for transmission;
- transmitting said digital signals to said at least one electronic display screen;
- displaying received digital signals in a textual format by said at least one electronic display screen;
- transmitting said digital signals to said at least one remote input terminal from said wireless microphone prior to submitting said digital signals for transmission to said at least one electronic display screen.

20. The method of claim 19, wherein registering said at least one electronic display screen with a web interface and associating said at least one electronic display screen with at least one remote input terminal involves inputting an identification number associated with a GRPS controller interface of said at least one electronic display screen.

\* \* \* \* \*